(12) United States Patent
Judas et al.

(10) Patent No.: US 10,518,875 B2
(45) Date of Patent: Dec. 31, 2019

(54) VERTICAL TAKE-OFF AIRCRAFT

(71) Applicant: Airbus Defence and Space GmbH, Taufkirchen (DE)

(72) Inventors: Michael Judas, München (DE); Clemens Gerlach, Stuttgart (DE); Thomas Krauss, Stuttgart (DE); Berthold Karrais, Epfendorf (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 391 days.

(21) Appl. No.: 15/164,405

(22) Filed: May 25, 2016

(65) Prior Publication Data

US 2016/0347447 A1    Dec. 1, 2016

(30) Foreign Application Priority Data

May 26, 2015    (DE) .................. 10 2015 006 511

(51) Int. Cl.
*B64C 29/00* (2006.01)
*B64C 27/20* (2006.01)
*B64C 39/02* (2006.01)

(52) U.S. Cl.
CPC ...... *B64C 29/0033* (2013.01); *B64C 29/0025* (2013.01); *B64C 39/024* (2013.01); *B64C 27/20* (2013.01); *B64C 2201/027* (2013.01); *B64C 2201/108* (2013.01); *B64C 2201/127* (2013.01); *B64C 2201/128* (2013.01)

(58) Field of Classification Search
CPC ... B64C 27/20; B64C 29/0025; B64C 29/005; B64C 2201/027
See application file for complete search history.

(56) References Cited

U.S. PATENT DOCUMENTS

| 5,419,514 A | * | 5/1995 | Ducan | ................. B64C 29/0033 244/12.4 |
| 7,188,803 B2 | * | 3/2007 | Ishiba | ....................... B60F 5/02 244/23 R |
| 8,308,522 B2 | * | 11/2012 | Van de Rostyne | ..... B64C 27/43 244/17.23 |
| 8,485,464 B2 | * | 7/2013 | Kroo | ................... B64C 29/0025 244/17.23 |

(Continued)

FOREIGN PATENT DOCUMENTS

| CN | 102069905 A | 5/2011 |
| CN | 202244078 U | 5/2012 |

(Continued)

OTHER PUBLICATIONS

Russian Patent Office, Office Action and Search Report dated Mar. 1, 2018 for RU2016120302, 6 pages.

(Continued)

*Primary Examiner* — Richard R. Green
(74) *Attorney, Agent, or Firm* — Lorenz & Kopf LLP

(57) ABSTRACT

An aircraft is provided, which comprises a support structure and at least four lift rotors. Each of the lift rotors is attached to the support structure and comprises at least one propeller. The lift rotors are constituted such that a rotational plane, in which the at least one propeller of the lift rotor rotates, is tilted with respect to a plane formed by the support structure.

12 Claims, 5 Drawing Sheets

(56) References Cited

U.S. PATENT DOCUMENTS

| | | | |
|---|---|---|---|
| 8,636,241 B2 * | 1/2014 | Lugg | B64C 29/0025 244/12.1 |
| 2009/0084890 A1 | 4/2009 | Reinhardt | |
| 2011/0001001 A1 | 1/2011 | Bryant | |
| 2011/0226892 A1 | 9/2011 | Crowther et al. | |

FOREIGN PATENT DOCUMENTS

| | | | |
|---|---|---|---|
| CN | 203094441 U | 7/2013 | |
| CN | 103359282 A | 10/2013 | |
| CN | 204279941 U | 4/2015 | |
| DE | 19700182 A1 | 7/1998 | |
| DE | 20220046 U1 | 4/2003 | |
| DE | 202004010057 U1 | 8/2004 | |
| DE | 102006019300 A1 | 10/2007 | |
| DE | 102013021884 A1 | 3/2015 | |
| RU | 2547950 C1 | 4/2015 | |
| WO | 2009095696 A2 | 8/2009 | |
| WO | 2013098736 A2 | 7/2013 | |
| WO | WO-2013098736 A2 * | 7/2013 | B64C 27/08 |
| WO | 2015019255 A1 | 2/2015 | |
| WO | 2015124556 A1 | 8/2015 | |

OTHER PUBLICATIONS

German Patent Office, German Office Action for German Patent Application No. 10 2015 006 511.4 dated Feb. 29, 2016.

* cited by examiner

VERTICAL TAKE-OFF AIRCRAFT

CROSS-REFERENCE TO RELATED APPLICATION

This application claims priority to German Patent Application No. 10 2015 006 511.4, filed May 26, 2015, which is incorporated herein by reference in its entirety.

TECHNICAL FIELD

The embodiments described herein relate to a vertical take-off aircraft similar for example to a quadcopter.

BACKGROUND

For many applications, it is desirable to have available an aircraft which can take off from as small an area as possible and does not therefore require a special large-area airport. For specific purposes, moreover, an aircraft is required which is agile and can be manoeuvred in a precise manner and which can preferably hover on the spot and display good hovering properties.

For example, aircraft are used for air surveillance and reconnaissance which should to be able to hover over an interesting target and for example take aerial photographs. In an alternative application, a vertical take-off aircraft, sometimes also referred to as a VTOL (Vertical Take-off and Landing), can be used to fly to regions that are difficult to access for humans or for other machines, for example in the context of civil protection interventions, in order for example to transport goods such as tools, foodstuffs and drugs in such regions.

For such interventions, there have been developed, amongst others, aircraft in which four or more propellers or rotors equipped with a propeller and at least one drive motor provide for an essentially vertically upward thrust so that the aircraft can thus rise vertically or hover. An aircraft provided with four such rotors is also referred to as a quadcopter, quadrocopter, quadricopter, quadrotor or hover platform. Such aircraft with more than three rotors providing the lift are generally referred to as multicopters, wherein, apart from quadcopters, variants with three rotors (tricopters), six rotors (hexacopters) or eight rotors (octocopters) are commonplace. Such aircraft are usually operated unmanned and can be correspondingly small. In some cases, these aircraft are also referred to as drones.

By a slight inclination of the overall aircraft or one or more rotors out of the horizontal, it is possible in the case of such aircraft also to provide a certain propulsion, in that a thrust generated by the rotors is inclined out of the vertical. In the case if quadrocopters and multicopters when operated with electric motors, the inclination is often regulated by a rotation speed control of the electric motors. That is to say that the flight controller of the craft controls the thrusts of the individual propellers through their respective rotational speed. The individual thrusts can thus be manipulated in such a way that the aircraft can rise or fall, or can be inclined forwards, backwards or laterally. As a result of these targeted rotational speed changes, however, not only the thrusts are changed, but also the torques or angular momentum from the motors, and the propellers. A torque thus arises around the vertical axis of the system. This torque can act in the clockwise direction or anticlockwise direction. A control of the aircraft's rotation around the vertical axis of the aircraft is thus possible. Such electrically driven multicopters make use of the change in the torque or angular momentum without blade adjustment.

However, such aircraft have the drawback that with an increasing size of the aircraft it becomes more difficult to change the angular momentum sufficiently.

SUMMARY

Proceeding from this, there may be a need to provide an improved aircraft.

An aircraft comprises a support structure and at least four lift rotors. Each of the lift rotors is fixed (i.e., attached, or mechanically coupled or connected) to the support structure and comprises at least one propeller. The lift rotors are constituted or formed such that a rotational plane, in which the at least one propeller of the lift rotor rotates, is tilted or inclined with respect to a plane formed by the support structure.

One idea underlying the aircraft described herein is that the sine wave effect is used by inclining or tilting the propeller planes. Apart from the actual lift component, a thrust component normal to the lift component arises due to the tilting of the rotational planes. This thrust component acts normal to the lift component and increases the angular momentum of the aircraft with a change in speed of the respective lift rotor. The aircraft can be better controlled by the increase in the angular momentum, more precisely the control can already be achieved by a smaller expenditure of force, or a larger aircraft can be controlled with the same expenditure of force.

The rotational plane of the propeller is preferably tilted inwards or outwards with respect to the plane formed by the support structure. The tilting of the rotational plane is preferably inwards or outwards from the centre point of the aircraft, i.e. with a viewing direction onto the aircraft from above with normal orientation of the aircraft or flight position, towards the centre of gravity of the aircraft or away from the centre of gravity of the aircraft.

The rotational plane of the propeller is preferably tilted inwards or outwards normal to a longitudinal axis in the main flight direction of the aircraft. For the tilting, it is advantageous if there is a preferential direction. The propellers of all the lift rotors of the aircraft preferably have the same tilt direction, i.e. the rotational planes of all the propellers are tilted either outwards or inwards. The rotational planes of the propellers can all be tilted by the same angle. Alternatively, the rotational planes of preferably two diagonally opposite lift rotors can also be tilted by a different angle with respect to the, for example, two other lift rotors.

The aircraft preferably has a main flight direction, which determines the longitudinal axis of the aircraft. In the case of an almost rotation-symmetrical structure of the aircraft, i.e., a central fuselage and for example four lift rotors arranged at a 90 degree angle thereto, a main flight direction is defined, along which the aforementioned longitudinal axis is orientated. With an extended or elongated structure of the aircraft, the aircraft usually has a main flight direction, wherein it should not be excluded that the aircraft may also be capable of flying against the actual main flight direction or in another direction.

In order to achieve an increase or gain in the angular momentum by tilting the rotational plane of the propellers, a specific direction is advantageous, since the effect will be cancelled out in the case of tilting radially inwards or outwards. As a result of tilting the rotational plane of the propellers normal to the longitudinal axis of the aircraft, i.e.

normal to the main flight direction of the aircraft, a preferably vertical thrust component arises, which can be used for the yawing of the aircraft. In contrast with a conventional pure change in angular momentum by a change in rotational speed for yawing, the torque is increased by the simultaneous tilting of the rotational plane of the propellers and even larger aircraft can thus easily be yawed, i.e. rotated around the vertical axis. Preferably, as a result of the vertical thrust component, which is generated by tilting the rotational plane, and the change in angular momentum, a torque is generated, which preferably acts in the same direction. This has the advantage that the torque that is generated by the change in angular momentum is increased by the vertical thrust component.

The tilting is preferably fixed. The tilting is preferably preset or preselected fixed. This has the advantage that no swivel joints or suchlike are required for the tilting of the lift rotors.

A sum of the lifting forces generated by the lift rotors preferably runs essentially through a centre of gravity of the aircraft. In order to enable yawing of the aircraft around the centre of gravity of the aircraft, the sum of the lifting forces generated by the lift rotors is such that in each case a pair of lift rotors is selected so that the latter are arranged diagonally opposite with respect to the centre of gravity of the aircraft. More precisely, in the case of a quadrocopter for example, i.e. an aircraft with four lift rotors, the two lift rotors lying mutually opposite with respect to the centre of gravity of the quadrocopter, i.e. lying diagonally opposite with respect to the centre of gravity, in each case form a pair. The two lift rotors of a pair of lift rotors are each preferably controlled analogously. The further pair of lift rotors is correspondingly counter-controlled, i.e. with an increase in rotational speed of the first rotor pair to generate a torque, a corresponding reduction in rotational speed of the second rotor pair takes place in order for example to keep the aircraft in the hover state at the same height. As a result of the increase in rotational speed of the first rotor pair, the lifting force is also increased apart from the thrust moment in the rotational direction. In order to counteract this lifting force in hover flight for example, the rotational speed of the second rotor pair is correspondingly reduced. The lifting forces are thus cancelled out and the torque of the second rotor pair is also reduced, i.e. the counter-thrust moment of the first rotor pair acts less powerfully in the desired rotational direction.

A torque around the vertical axis of the aircraft can preferably be generated by a change in speed of at least two lift rotors lying diagonally opposite with respect to the centre of gravity of the aircraft. The propellers are preferably inclined in such a way that they can generate a torque around the vertical axis.

The sum of the torques generated by the lift rotors in hover flight is preferably almost zero. The differential forces are thus cancelled out in undisturbed hover flight. The resultant torque and the resultant force in the X-Y plane are therefore zero.

Two diagonally opposite lift rotors preferably have in each case an opposite rotational direction with respect to the at least two further diagonally opposite lift rotors. The aircraft can be kept in hover flight by the different rotational direction without the aircraft itself constantly rotating around the vertical axis. In the case of a quadrocopter, for example, the lift rotors of the two rotor pairs generate an opposite torque, so that the aircraft does not experience its own rotation. A desired torque is generated only when there is a change of rotational speed of at least one rotor pair and the aircraft rotates as desired around the vertical axis, i.e. it yaws.

A thrust component is preferably present normal to the lift component as result of the tilting of the rotational plane of the lift rotors.

The torque of the lift rotor increased by the thrust component is preferably greater, the farther the lift rotor is located from the centre of gravity of the aircraft in the direction of the longitudinal axis of the aircraft. If the distance of the tilted lift rotors in the direction of the longitudinal axis to the centre of gravity, i.e. parallel to the longitudinal axis, is equal to zero, i.e. at or in the vicinity of the centre of gravity, the thrust component at the centre of gravity acts normal to the main flight direction. No torque, or only a very small torque, thus arises, which torque could be used for the rotation of the aircraft around the vertical axis. The greater the distance of the lift rotors in the direction of the longitudinal axis from the centre of gravity of the aircraft, the greater the effect of the thrust moment, which can be used by tilting the rotational plane of the lift rotors.

The lift rotors are preferably constituted such that the rotational plane is stationary in relation to a rotor shaft of the lift rotor, said rotor shaft being driven by a motor.

The propeller blades of the lift rotor are preferably rigidly connected to the rotor shaft. A straightforward structure of the lift rotor is enabled as a result of a rigid connection of the propeller blades of the lift rotor to the rotor shaft. A change in the lifting force is achieved here by a change in rotational speed and not by an adjustment, i.e. rotation, of the propeller blades around the longitudinal axis of the propeller blades.

Each of the lift rotors is preferably driven by an electric motor. The electrical energy for the electric motor can be provided by a central generator, with for example a combustion engine, or by a battery. A further drive, such as for example a thrust drive with a push propeller or a pull propeller, can be driven for example by a central generator, for example a combustion engine. The thrust drive can be driven, for example via a shaft, by the combustion engine or by an electric motor.

The aircraft is preferably a VTOL (Vertical Take-off and Landing). A VTOL can use the lift rotors of the aircraft for take-off and landing. A further push or pull drive, for example, can be used for the thrust drive during cruising flight.

The aircraft is preferably a manned or unmanned aircraft.

In addition, other objects, desirable features and characteristics will become apparent from the subsequent summary and detailed description, and the appended claims, taken in conjunction with the accompanying drawings and this background.

BRIEF DESCRIPTION OF THE DRAWINGS

The various embodiments will hereinafter be described in conjunction with the following drawing figures, wherein like numerals denote like elements, and.

In the drawings, identical reference numbers generally relate to similar parts in the various views. The drawings are not necessarily true to scale; the focus is instead generally placed on illustration of the principles of the embodiment. In the following description, various embodiments are described by reference to the following drawings. In the figures.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

The word "exemplary" is used herein with the meaning "serving as an example, case or illustration". Each embodiment or development that is described herein as "exemplary" is not necessarily to be construed as preferable or advantageous with respect to other embodiments of developments.

In the following detailed description, reference is made to the appended drawings, which form a part of this description and in which specific embodiments Fig.can be executed are shown for the purpose of illustration. In this regard, directional terminology such as for example "above", "below", "forwards", "rearwards", "front", "rear", etc. is used in relation to the orientation of the described Fig.(s). Since components of embodiments can be positioned in a number of different orientations, the directional terminology is used for the purpose of illustration and is on no account limiting. It is understood that other embodiments can be used and structural or logical changes can be made without departing from the protective scope of the present embodiment. It is understood that the features of the various exemplary embodiments described herein can be combined with one another, insofar as not indicated otherwise. The following detailed description is not therefore to be construed in a limiting sense, and the scope of protection of the present embodiment is defined by the appended claims.

Within the scope of this description, the terms "connected", "attached" and "coupled" are used to describe both a direct and also an indirect connection, a direct or indirect attachment as well as a direct or indirect coupling. In the figures, identical or similar elements are provided with identical reference numbers, insofar as this is expedient.

Figure 1:
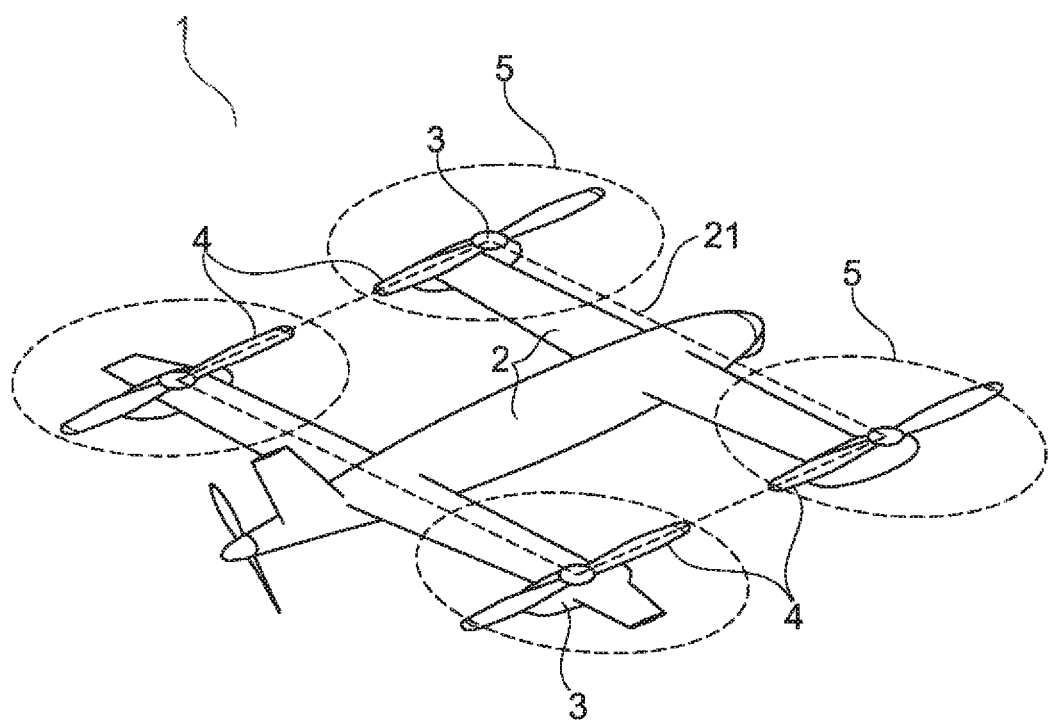
FIG. 1 shows a first embodiment of the aircraft in a three-dimensional view.

FIG. 1 shows a first exemplary embodiment of aircraft 1 in a three-dimensional view. Aircraft 1 comprises a support structure 2 and at least four lift rotors 3. Each of rotors 3 is fixed to support structure 2 and comprises at least one propeller 4. Lift rotors 3 are constituted such that a rotational plane, in which the at least one propeller 4 of lift rotor 3, or in which propellers 4 of the four lift rotors 3 rotate, is tilted with respect to a plane 21 formed by support structure 2. The tilting of rotational plane 5 of propellers 4 is represented in detail in FIG. 2.

Exemplary aircraft 1 represented in FIG. 1 comprises, moreover, a thrust drive for fast forward flight. The embodiment described herein, however, is independent of the nature of the drive of aircraft 1 and can also be used for aircraft 1 in which lift rotors 3 are also used for fast forward flight.

Figure 2A:
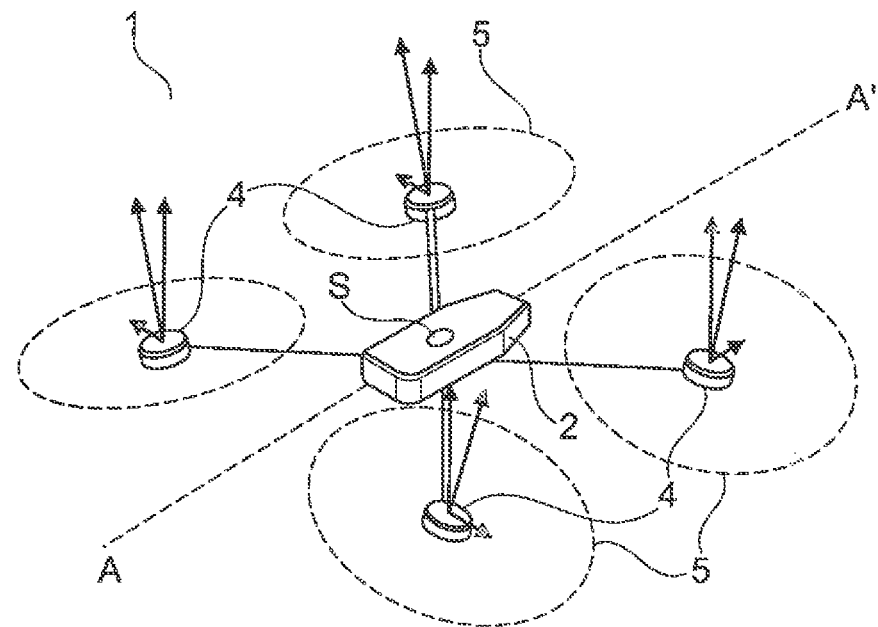
FIG. 2A shows a three-dimensional view of an aircraft.
Figure 2B:
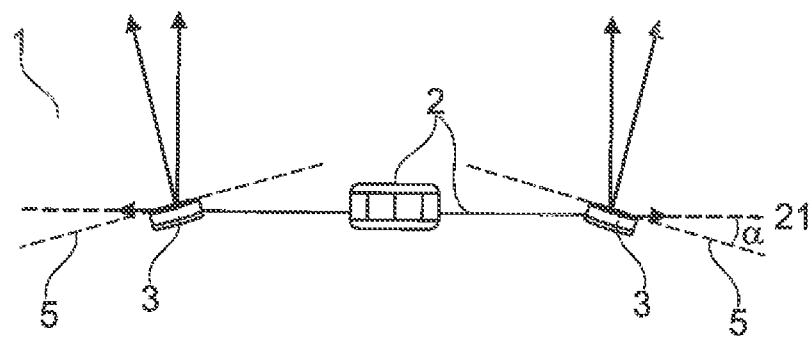
FIG. 2B is a view of the aircraft along line A-A' in FIG. 2A.

FIG. 2 shows various views of a simplified representation of an exemplary embodiment of aircraft 1. In the exemplary embodiment represented in FIGS. 2A and 2B, support structure 2 of aircraft 1 is reduced to a minimum in order to provide a better representation of the tilting of rotational plane 5 of the propellers (not represented) with respect to plane 21 formed by support structure 2.

FIGS. 2A shows a three-dimensional view of aircraft 1. Rotational plane 1 of the propellers of lift rotors 3 is tilted outwards normal to longitudinal axis A-A' of aircraft 1. As a result of the inclination or tilting of the rotational axis, the thrust component of lift rotor 3 no longer acts 100% upwards, but rather contains a thrust component which is directed outwards. A representation of the acting forces is represented in further FIGS. 3 to 5 in general and for different flight situations.

FIG. 2B is a view of aircraft 1 from FIG. 2A in the direction of longitudinal axis A-A' from position A. It can clearly be seen here that rotational plane 5 of the propellers (not represented) of lift rotors 3 is tilted outwards with respect to plane 21 formed by support structure 2 of aircraft 1. The tilting direction is directed outwards from the centre of gravity of aircraft 1 normal to longitudinal axis A-A'. As indicated by the force vectors, as a result of the tilting the thrust component of lift rotor 3 acts not only upwards, but also normal to longitudinal axis A-A', i.e. outwards. The sine wave effect is used by inclining rotational planes 5. It is important here that there is a preferential direction. The propellers should not act simply radially outwards, because the effect would then be cancelled. The propellers, and therefore rotational plane 5, should be inclined in such a way that a torque can be generated around the vertical axis. The resultant thrust component, i.e. the sum of the vertical and the horizontal thrust component, acts normal to rotational plane 5, i.e. tilted outwards slightly from the vertical by angle α.

Figure 3:
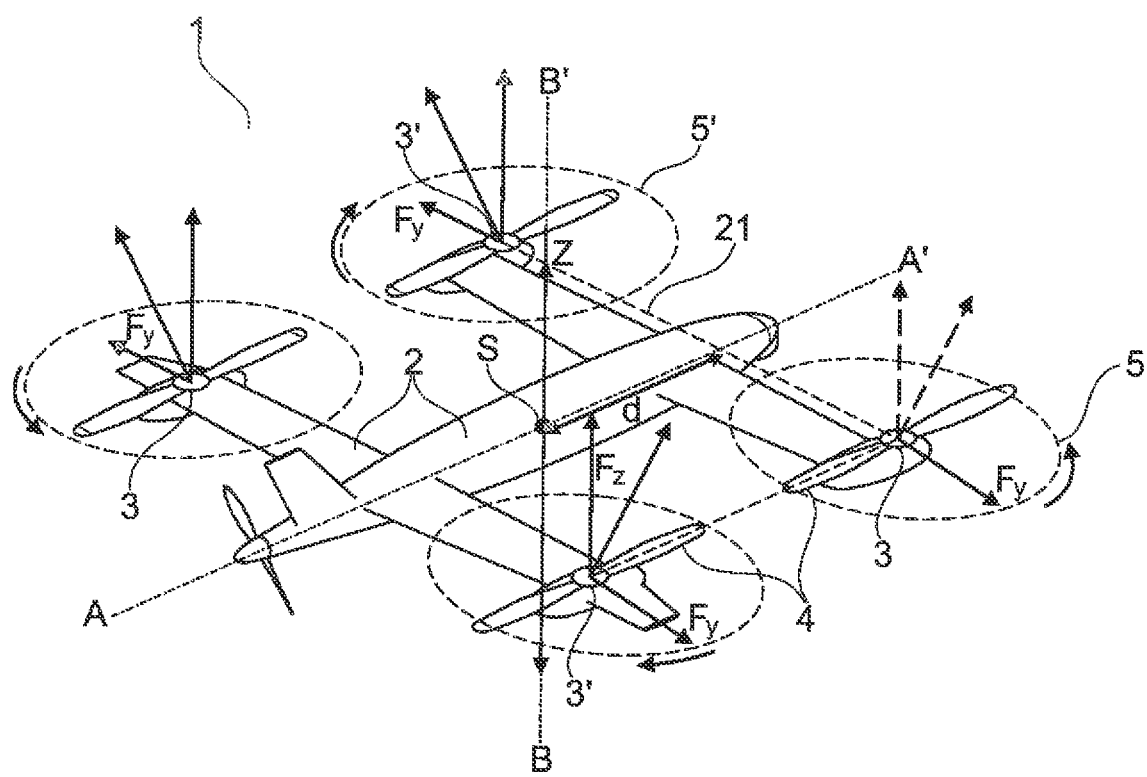
FIG. 3 shows a representation of the forces of an embodiment of the aircraft.

FIG. 3 shows a representation of the forces of an exemplary embodiment of aircraft 1. In the case of aircraft 1 represented in FIG. 3, the rotational direction of propellers 4 of lift rotors 3, 3' is also represented. The rotational direction of propellers 4 of lift rotors 3, i.e. of two diagonally opposite lift rotor 3, is directed clockwise here. The rotational direction of propellers 4 of the other two diagonally opposite lift rotors 3' is directed counterclockwise. As a result of the different rotational direction of propellers 4 of rotors 3, 3', torques of lift rotors 3, 3' can be cancelled. Apart from thrust component Fz acting in the Z-direction, i.e. vertically, each lift rotor 3, 3' has a thrust component Fy acting in the Y-direction, i.e. horizontally, as a result of the inclination or tilting of rotational plane 5 of propellers 4.

The resultant thrust component results from the addition of the two thrust components Fz and Fy. With a targeted control of the rotational speed of lift rotors 3, 3', and an accompanying thrust change, a force pair always arises which in each case generates a torque around vertical axis B-B'.

By way of example, the thrust component in the Z-direction is represented as a dashed line in the case of right-hand front lift rotor 3. The thrust component in the Y-direction is represented with a continuous line and the resultant thrust component with a dash-dot-dot line. In hover flight, the sum of thrust components Fz of individual lift rotors 3 produces the total thrust component in the Z-direction and corresponds to the weight force or weight of aircraft 1.

The thrust component of lift rotors 3 is greater accordingly as lift rotors 3 are more distant from centre of gravity S of aircraft 1 in the direction of longitudinal axis A-A' of aircraft 1. More precisely, the effect of the torque, which is generated by horizontal thrust component Fy, is all the greater, the greater distance d from centre of gravity S in longitudinal direction A-A' of aircraft 1.

FIG. 4 shows the force distribution with different flight manoeuvres of a simplified representation of an exemplary embodiment of aircraft 1. In the exemplary embodiment represented in FIG. 4, the actual support structure of aircraft 1 is represented merely by way of indication for the purpose of better representation.

Figure 4A:
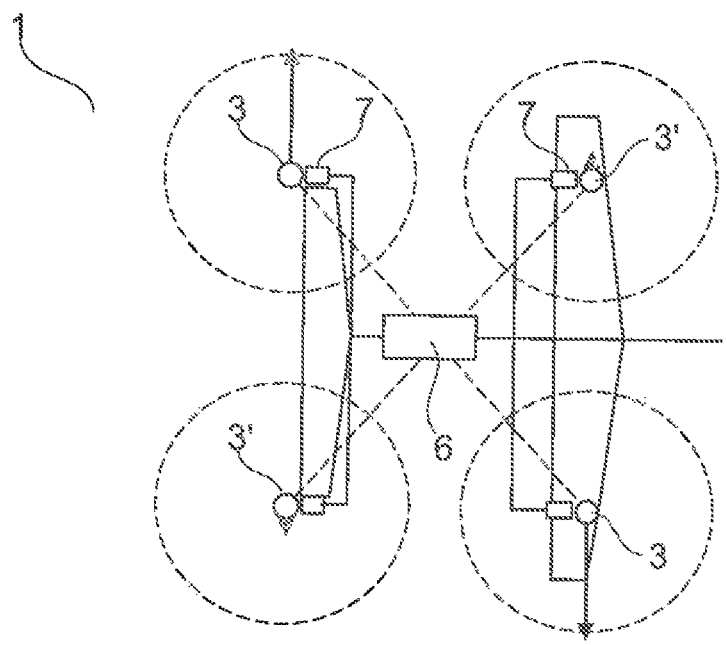
FIG. 4A shows a rotation of the aircraft in hover flight.

FIG. 4A shows a rotation of aircraft 1 in hover flight. The torques present at individual lift rotors 3, 3' are represented by arrows. Individual motor controls 7 of lift rotors 3, 3' are controlled via a flight controller 6, e.g. a flight control computer (FCC), in such a way that the rotational speed of two mutually opposite lift rotors 3 is increased. In order to keep aircraft 1 in hover flight at the same height, the rotational speed of the other two lift rotors 3' is correspondingly reduced. The sum of the vertical thrust components thus remains equal. The increase in the vertical thrust component at lift rotors 3 generates a torque around the vertical axis of aircraft 1.

Figure 4B:
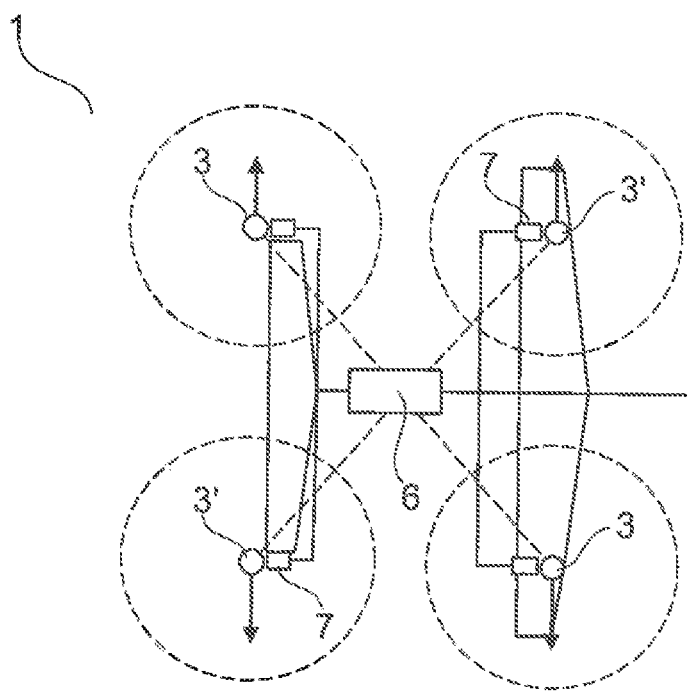
FIG. 4B shows a hover flight of the aircraft.

FIG. 4B shows a hover flight of the aircraft 1. The torques present at individual lift rotors 3, 3' are represented by arrows. The torques of lift rotors 3, 3' are all of equal magnitude. The sum of the vertical thrust components remains the same for the hover flight. The differential forces cancel out in undisturbed hover flight. The resultant torque and the resultant force in the X-Y plane is zero. With targeted control of the rotational speed, or a change in thrust, a force pair always arises which in each case generates a torque around the vertical axis.

Figure 5:
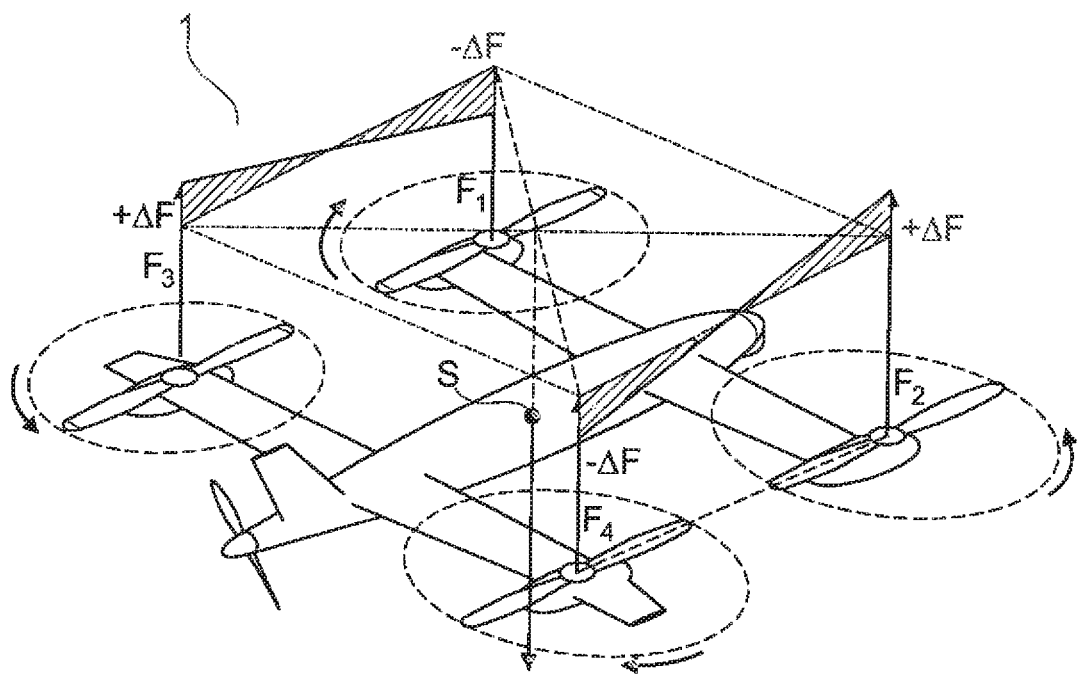
FIG. 5 shows a representation of the resultant forces of an embodiment of the aircraft.

FIG. 5 shows a representation of the resultant forces of an exemplary embodiment of aircraft 1.

Differential forces ΔF cancel out in undisturbed hover flight. The resultant torque and the resultant force in the X-Y plane is therefore zero. A force pair which in each case generates a torque around the vertical axis always arises with a targeted control of the rotational speed, and an associated change in thrust. The sum of all the forces in the X-Y plane, on the other hand, remains at 0.

Figure 6:
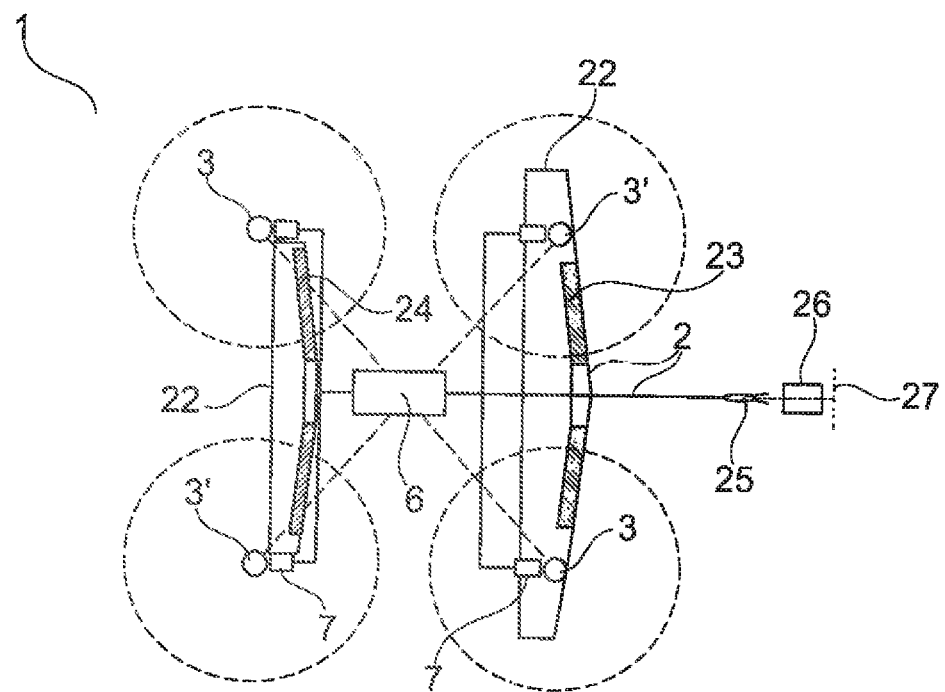
FIG. 6 shows a representation of the control concept of an embodiment of the aircraft.

FIG. 6 shows a representation of a control concept of an exemplary embodiment of aircraft 1.

Aircraft 1 represented in FIG. 6 comprises a support structure 2 with two support surfaces 22. Support surfaces 22 are provided with an elevator 23 and an aileron 24. Support surfaces 22 generate a lift in fast forward flight and thus improve the aerodynamics and therefore the range of the aircraft. For the lateral control, aircraft 1 also comprises a rudder 25, or vertical stabiliser. The control of elevator 23, aileron 24 and rudder 25 takes place via a flight controller 6. Flight controller 6 is connected to motor control 7 of the electric motors of lift rotors 3, 3' in order to control the rotational speed of lift rotors 3, 3'. For fast cruising flight, aircraft 1 comprises a thrust propeller 27, which is driven by an aero-engine 26. The control of the rotational speed of thrust propeller 27 and, connected with this, the control of the power of aero-engine 26 takes place for example via flight controller 6. Aero-engine 26 is for example a combustion engine which directly drives thrust propeller 27 and generates current for the operation of the electric motors of lift rotors 3. Alternatively, in an exemplary embodiment not represented, thrust propeller 27 can also be driven indirectly by an electric motor, which is supplied with current for example via aero-engine 26 or a battery. In a further exemplary embodiment not represented, aircraft 1 can also be provided with a pull propeller for fast cruising flight.

Although the embodiment has been shown and described primarily by reference to specific embodiments, it should be understood by those familiar with the pertinent technical field that numerous modifications with regard to embodiment and details thereof can be made without departing from the essence and scope of the embodiment as defined by the appended claims. The scope of the embodiment is thus determined by the appended claims, and it is therefore intended that all modifications that fall within the meaning or the equivalent scope of the claims are covered.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. An aircraft, comprising:
   a support structure;
   a flight controller;
   a first pair of lift rotors comprising a first lift rotor and a second lift rotor lying diagonally opposite with respect to a center of gravity of the aircraft; and
   a second pair of lift rotors comprising a third lift rotor and a fourth lift rotor lying diagonally opposite with respect to the center of gravity of the aircraft, the first lift rotor and the third lift rotor located on one side of a longitudinal axis of the aircraft, and the second lift rotor and the fourth lift rotor located on another side of the longitudinal axis of the aircraft;
   wherein the first lift rotor and the second lift rotor have a first rotational direction, and the third lift rotor and the fourth lift rotor have a second rotational direction that is opposite the first rotational direction;
   wherein each of the lift rotors is attached to the support structure and comprises at least one propeller,
   wherein each of the lift rotors is formed such that a rotational plane, in which the at least one propeller of the lift rotor rotates, is tilted outwards with respect to a plane formed by the support structure,
   wherein rotational planes of the first lift rotor and the second lift rotor are tilted outward or inward by a first angle, and rotational planes of the third lift rotor and the fourth lift rotor are tilted outward or inward by a second angle that is different than the first angle,
   wherein tilt of each of the lift rotors is such that the lift rotor generates a thrust which has a vertical thrust component and a horizontal thrust component, the horizontal thrust component being directed outwards of the aircraft and normal to a longitudinal axis of the aircraft in a main flight direction, and
   wherein the flight controller controls yawing of the aircraft around the center of gravity of the aircraft by increasing rotational speed of the first pair of lift rotors, and by decreasing rotational speed of the second pair of lift rotors by a corresponding amount, to maintain a hover state of the aircraft while generating torque around a vertical axis of the aircraft.

2. The aircraft of claim 1, wherein the rotational plane of the propeller is tilted outwards normal to a longitudinal axis in a main flight direction of the aircraft.

3. The aircraft of claim 1, wherein a sum of the lifting forces generated by the lift rotors runs essentially through the center of gravity of the aircraft.

4. The aircraft of claim 1, wherein the sum of the torques generated by the lift rotors in hover flight is almost zero.

5. The aircraft of claim 1 wherein the aircraft, with a sum of the torques generated by the lift rotors that is not equal to zero, can be rotated around the yawing axis.

6. The aircraft of claim 1, wherein a thrust component normal to the lift component is present due to the tilting of the rotational plane of the lift rotors.

7. The aircraft of claim 6, wherein the torque of the lift rotor increased by the thrust component is greater accordingly as the lift rotor is more distant from the center of gravity of the aircraft in the direction of the longitudinal axis of the aircraft.

8. The aircraft of claim 1, wherein the lift rotors are formed such that the rotational plane is stationary in relation to a rotor shaft of the lift rotor, said rotor shaft being driven by a motor.

9. The aircraft of claim 1, wherein propeller blades of the lift rotor are rigidly connected to the rotor shaft.

10. The aircraft of claim 1, wherein each of the lift rotors is driven by an electric motor.

11. The aircraft of claim 1, wherein the aircraft is a VTOL.

12. The aircraft of claim 1, wherein the aircraft is a manned or unmanned aircraft.

* * * * *